(12) United States Patent
Nakagawa et al.

(10) Patent No.: US 9,358,718 B2
(45) Date of Patent: Jun. 7, 2016

(54) SHIELDING STRUCTURE OF A THROUGH-HOLE FORMED IN A WALL OF A PLASTIC HOLLOW PRODUCT

(75) Inventors: Tatsuya Nakagawa, Matsudo (JP); Takashi Tamura, Kumagaya (JP)

(73) Assignee: Excell Corporation, Chiba-Ken (JP)

( * ) Notice: Subject to any disclaimer, the term of this patent is extended or adjusted under 35 U.S.C. 154(b) by 1631 days.

(21) Appl. No.: 12/009,860

(22) Filed: Jan. 22, 2008

(65) Prior Publication Data

US 2008/0211191 A1    Sep. 4, 2008

(30) Foreign Application Priority Data

Jan. 22, 2007    (JP) .................................... 2007-11961

(51) Int. Cl.
| | |
|---|---|
| F16L 41/08 | (2006.01) |
| B29C 49/20 | (2006.01) |
| B29C 49/04 | (2006.01) |
| B29L 23/00 | (2006.01) |
| B29L 31/30 | (2006.01) |

(52) U.S. Cl.
CPC ................. B29C 49/20 (2013.01); *B29C 49/04* (2013.01); *B29C 2049/2017* (2013.01); *B29C 2049/2043* (2013.01); *B29C 2049/2069* (2013.01); *B29L 2023/004* (2013.01); *B29L 2031/3005* (2013.01)

(58) Field of Classification Search
CPC ......... F16L 41/08; F16L 41/086; F16L 41/12; F16L 41/14; B29C 2049/2069; B29C 2049/2043; B29C 2049/2017

USPC ......... 285/192, 201, 202, 203, 208, 221, 422, 285/423, 286.1, 295.3

See application file for complete search history.

(56) References Cited

U.S. PATENT DOCUMENTS

| | | | | |
|---|---|---|---|---|
| 1,893,980 | A | * | 1/1933 | Bell ............................... 285/203 |
| 2,233,599 | A | * | 3/1941 | Gilbert, Sr. .................... 277/396 |
| 3,864,234 | A | * | 2/1975 | Wasson ..................... 204/196.15 |
| 3,869,153 | A | * | 3/1975 | De Vincent et al. ........ 285/124.3 |
| 4,183,562 | A | * | 1/1980 | Watkins et al. ................ 285/405 |
| 4,949,744 | A | * | 8/1990 | Heed et al. .................. 137/15.15 |
| 5,104,472 | A | * | 4/1992 | Kasugai .................. B29C 49/20 |
| | | | | 156/245 |
| 5,524,938 | A | * | 6/1996 | Halder .......................... 285/201 |
| 6,415,941 | B1 | * | 7/2002 | Huse ....................... B29C 41/04 |
| | | | | 220/4.13 |

* cited by examiner

*Primary Examiner* — David E Bochna
(74) *Attorney, Agent, or Firm* — Cozen O'Connor

(57) ABSTRACT

An improved structure for sealing a through-hole formed in a plastic hollow product when mounting a component such as a sensor on the product is provided. A cylindrical section is provided in a peripheral wall of the plastic hollow product as projecting radially outwardly from the peripheral wall and an inner circumferential surface of the cylindrical section defines the through-hole for communication between the interior and the exterior of the product. A sensor component is mounted with its sensor portion extending through the through-hole and an O-ring is disposed between the sensor portion and the inner circumferential surface of the cylindrical section which is backed by a component mounting member.

12 Claims, 4 Drawing Sheets

SHIELDING STRUCTURE OF A THROUGH-HOLE FORMED IN A WALL OF A PLASTIC HOLLOW PRODUCT

BACKGROUND OF THE INVENTION

1. Field of the Invention

This invention generally relates to a shielding structure of a through-hole formed in a plastic hollow product and in particular to a shielding structure in the case when a through-hole is formed in a duct, such as a duct of an air-intake system of an automobile engine, for detecting its interior environment and a sensor is located in the through-hole.

2. Description of the Prior Art

Heretofore, in the case of providing a through-hole in a wall of a plastic hollow product and providing a branch pipe in communication with the interior space of the hollow product via the through-hole, a technology for securing air-tightness between the hollow product and the branch pipe was known. For example, Japanese Patent Laid-open Pub. No. Sho 64-56532, assigned to the assignee of this application, discloses a sealing technology in which the sealing characteristic is improved between the plastic hollow product and the branch pipe through thermal adhesiveness. In addition, another Japanese Pat. Laid-open Pub. No. Hei 7-124999, also assigned to the assignee of this application, discloses a sealing technology in which the air-tightness between the hollow product and the branch pipe by having the branch pipe integrally molded with the plastic hollow product according to an insert molding method. Although these technologies allow to improve the sealing characteristic between a plastic hollow product and a branch pipe added thereto, they are directed to improve the air-tightness between the plastic hollow product and the branch pipe and not to sealing of a through-hole formed in a wall of a plastic hollow product and of the hollow space of a branch pipe itself.

In an air-intake duct for use in an air-intake system of an automobile engine, it is required to detect the condition of the fluid flowing through the air-intake duct. For example, in order to control the operating condition of an engine for the purpose of enhancing the fuel consumption efficiency and the purification of the exhaust gas, various kinds of sensor are used for detecting the condition of the fluid flowing through the air-intake duct. These sensors are mounted at their desired locations along the air-intake duct to detect the environment inside the air-intake duct and the detected information is then used to control the operating condition of the engine.

In this manner, components such as various kinds of sensors are required to be mounted on their desired locations along the air-intake duct, in which case, if the air-intake duct is comprised of a plastic hollow product, since its rigidity is relatively low as compared with a metal, there arises a problem of securing the air-tightness between a sensor and the air-intake duct properly. That is, in providing a component such as a sensor, it is necessary to provide a through-hole in the wall of the air-intake duct and have the component inserted into the through-hole to detect the condition inside the air-intake duct and then to provide the detected information to a controller. In this instance, since the air-intake duct is continuously subjected to vibration during the operation of the engine, in order to have the component securely held to the air-intake duct, the component is required to be fixedly attached to the air-intake duct. In addition, because of the necessity for possible replacement of the components, the component is typically fixedly attached to the air-intake duct using a nut and a bolt. In such a case, either one of a nut and a bolt has to be fixed to the air-intake duct; however, if the air-intake duct is comprised of a plastic hollow product, there is difficulty in having a nut or a bolt securely fixed in the plastic hollow product.

Moreover, when a component such as a sensor is mounted in a predetermined position as inserted into a through-hole formed in the air-intake duct, there arises difficulty in sealing the gap between the component and the through-hole. That is, if the air-intake duct is comprised of a plastic hollow product, it is required to be made to be relatively high in rigidity so that a nut or a bolt can be securely held, but in the case of a plastic hollow product which is relatively high in rigidity, there arises a problem of securely sealing the gap between the component and the through-hole because of constant application of vibration to the air-intake duct during the operation of the engine.

Therefore, there is a need to provide a sealing technology capable of securely sealing the through-hole formed in the wall of a plastic hollow product. For example, in the case of having a component, such as a sensor, mounted in the air-intake duct as inserted into the through-hole, there is a need to develop a sealing technology which allows to have the component mounted at a predetermined position securely and to have the gap between the through-hole and the component sealed securely. In particular, in the case when a plastic hollow product is used as an air-intake duct of an automobile engine, since the hollow product is constantly subjected to vibration at least during the operation of the engine, there is a need to develop a sealing technology that does not deteriorate the sealing characteristic even if such vibration is applied.

SUMMARY OF THE INVENTION

In accordance with one aspect of the present invention, there is provided a sealing structure of a through-hole formed in a wall of a plastic hollow product, comprising:

a plastic hollow product including a first wall portion, in which a through-hole is formed for fluidic communication between the interior and the exterior of the product, and first engaging means;

a component mounting member including a contact portion in contact with an outer circumferential surface of said first wall portion and second engaging means in engagement with said first engaging means to have said component mounting member mechanically engaged with said hollow product;

securing means for securing a component positioned to extend through said through-hole to said component mounting member; and sealing means interposed between said first wall portion and said component in said through-hole.

One object of the present invention is to provide an improved sealing structure of a plastic hollow product.

Preferably, the plastic hollow product is a product formed by blow molding from a first resin. The hollow plastic product preferably constitutes at least a portion of the air-intake duct of an automobile engine. The plastic hollow product preferably includes a peripheral wall which defines an hollow space, and the first wall portion includes an outwardly projecting cylindrical section having an inner circumferential surface, which defines the through-hole, and an outer circumferential surface. The first engaging means is preferably of a dove-tail or V-shaped undercut structure and the second engaging mean is preferably of a wedge-shaped undercut structure which is preferably provided around a peripheral end portion and complementary to the V-shaped undercut structure. The component mounting member is preferably integrally molded to the plastic hollow product as an insert when the plastic hollow product is fabricated by a blow molding method. The first and second engaging means are preferably brought into engagement when molded by blow molding. The component mounting member is preferably fabricated by an injection molding method from a second resin, which is preferably higher in rigidity than the first resin. The second resin preferably includes a material, such as fiber glass, which increases the rigidity. The securing means preferably includes at least one nut buried in the component mounting member and at least one bolt which extends through at least one bolt hole formed in the component mounting member to be screwed into the nut for tightening. The sealing means is preferably comprised of an elastic member which is preferably an O-ring. The component mounting member preferably includes a sensor mounted thereon for detecting the environment of the internal space of the plastic hollow product.

Another object of the present invention to provide an improved sealing structure of a plastic hollow product, which allows to have a component such as a sensor securely mounted in a through-hole formed in a wall of the plastic hollow product.

Another object of the present invention is to provide a hollow plastic product having an improved sealing structure which is reliable in structure even if subjected to vibration and easy to manufacture.

A further object of the present invention is to provide an improved air intake duct particularly suitable for use in an automobile and its manufacturing method.

DESCRIPTION OF THE PREFERRED EMBODIMENTS

Figure 1:
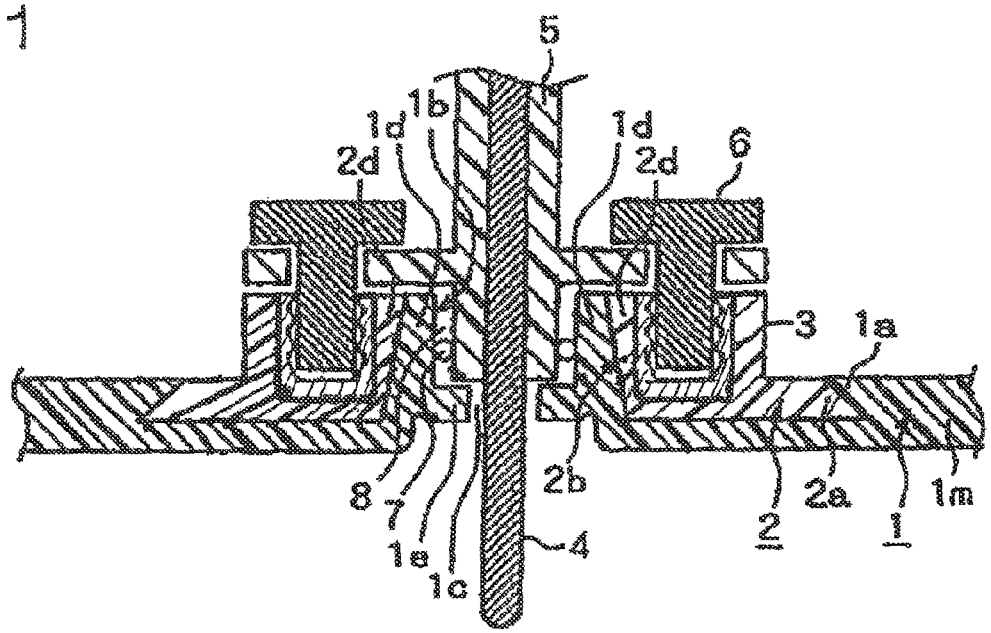
FIG. 1 is a schematic illustration showing in cross-sectional view a sealing structure of a hollow plastic product in accordance with one embodiment of the present invention.

Referring now to FIG. 1, there is schematically shown a sealing structure of a hollow plastic product 1 suitable for use as an air intake duct of an internal combustion engine for use in an automobile according to one embodiment of the present invention. The plastic hollow product 1 is preferably formed by blow molding from a first resin and includes a peripheral wall $1m$ which defines a hollow space of a desired shape, such as a duct, pipe or tube. The plastic hollow product 1 is provided with a component mounting member 2, which is preferably comprised of a second resin and integrally molded with the plastic hollow product as an insert when the plastic hollow product 1 is formed by blow molding. During blow molding of the plastic hollow product 1 with the component mounting member 2 as an insert, an interface therebetween is subjected to a thermal adhesion reaction so that these two are integrated together. Moreover, in the instant embodiment, as shown in FIG. 1, the peripheral wall $1m$ is formed with a dove-shaped or V-shaped undercut section $1a$, on the other hand, a complementary wedge-shaped undercut section $2a$ is formed in a peripheral end section of component mounting member 2. Thus, because of engagement between these complementary undercut sections $1a$ and $2a$, the component mounting member 2 is held mechanically by the plastic hollow product 1 also. That is, the component mounting member 2 is firmly integrated with the plastic hollow product 1 through thermal adhesion at the interface as well as a mechanical coupling of the complementary undercut engagement.

A pair of nuts 3 is provided as buried in the component mounting member 2 as shown. The component mounting member 2 is preferably formed by injection molding, in which case, nuts 3 are provided as inserts in a mold. Since nuts 3 are provided as buried, the component mounting member 2 is formed by injection molding from a second resin which contains a reinforcing material such as fiber glass or which is a material of high rigidity itself. It is to be noted that FIG. 1 is a sectional view and the component mounting member 2 is generally in the shape of a ring.

There is formed a cylindrical section $1d$ which projects outwardly from the peripheral wall 1 m of plastic hollow product 1. At the bottom of the cylindrical section $1d$ is provided a bottom wall $1e$ which is formed with an opening $1c$. An outer circumferential surface of cylindrical section $1d$ generally defines a conical surface which contacts a complementary and generally conical, inner circumferential surface $2b$ of the component mounting member 2. The component mounting member 2 includes a generally ring-shaped main body $2d$, in which nuts 3 are buried, and the main body $2d$ has the conical, inner circumferential surface $2b$ in contact with the outer circumferential surface of the cylindrical section $1d$ of plastic hollow product 1. The cylindrical section $1d$ has an inner circumferential surface $1b$, which defines a through-hole or a component receiving space 8, and the outer circumferential surface in contact with the inner circumferential surface $2b$ of the main body $2d$ of the component mounting member 2. Thus, in accordance with the present invention, the first resin to be used for forming the plastic hollow product 1 may be selected from a resin material suitable for blow molding, such as a resin material relatively abundant in flexibility, and the second resin to be used for forming the component mounting member 2 may be selected from a resin material which is relatively high in rigidity or which contains a reinforcing material, such as fiber glass, so that the cylindrical section 1*d* defining the through-hole or component receiving space 8 may have a property relatively abundant in flexibility suitable for absorbing vibration and on the other hand the main body 2*d* located around the cylindrical section 1*d* may have a property relatively abundant in rigidity, thereby allowing to prevent the cylindrical section 1*d* from being deformed.

As shown in FIG. 1, a component including a sensor 4 and a generally cylindrical sensor holding member 5 is provided, and the sensor holding member 5 holds the sensor 4 in position when mounted on the component mounting member 2. The sensor holding member 5 has a pair of wings extending radially in the opposite directions and each of the pair of wings is provided with a hole, through which a bolt 6 may extend to be threaded into the corresponding nut 3 for tightening. With such a structure, the sensor 4 extends through the through-hole 8 defined by the inner circumferential surface of cylindrical section 1*d* and is located at a predetermined position with its tip end portion located in position in the interior space of plastic hollow product 1. In this embodiment, a sealing member 7 is disposed in a gap between the sensor holding member 5 and the inner circumferential surface 1*b* of cylindrical section 1*d* to thereby have the gap sealed, so that a desired air-tight condition is established. The sealing member 7 is preferably comprised of an elastic material, and, most preferably, of an O-ring. With such a structure, since the sealing member 7 is in contact with the cylindrical section 1*d* comprised of the first resin which is relatively flexible, even if vibration is applied to the sealing structure 1, the sealing condition may be properly and securely maintained, and, at the same time, since the cylindrical section 1*d* is backed by the main body 2*d* comprised of the second resin which is relatively high in rigidity, the cylindrical section 1*d* is prevented from being deformed abnormally, thereby allowing to prevent the sealing condition from being deteriorated significantly.

Now, turning to FIGS. 2 through 5, a method for manufacturing the sealing structure shown in FIG. 1 in accordance with one embodiment of the present invention will be described below.

Figure 2:
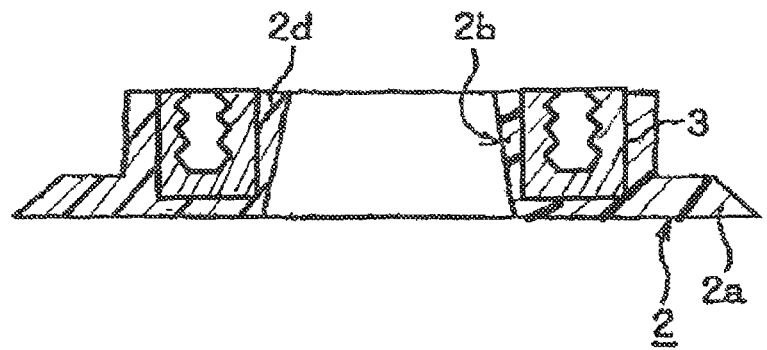
FIG. 2 is a schematic illustration showing in cross-sectional view a component mounting member 2 which constitutes a portion of the sealing structure shown in FIG. 1.

FIG. 2 shows in schematic illustration the component mounting member 2 according to one embodiment of the present invention. The component mounting member 2 is generally in the shape of a ring and includes the main body 2*d* and an inclined end section 2*a* formed in the shape of a wedge along the outer periphery of a collar extending radially outwardly from a bottom portion of main body 2*d*. The component mounting member 2 is fabricated in advance by injection molding from the second resin. Preferably, the second resin is a resin containing fiber glass or any other reinforcing filler material or a resin which is relatively high in rigidity in itself. In the illustrated embodiment, a pair of nuts 3 is buried in the main body 2*d* of component mounting member 2. These nuts 3 are located in a mold as inserts when the component mounting member 2 is formed by injection molding so that the nuts become buried in the main body 2*d* when the component mounting member 2 is formed by injection molding.

Figure 3:
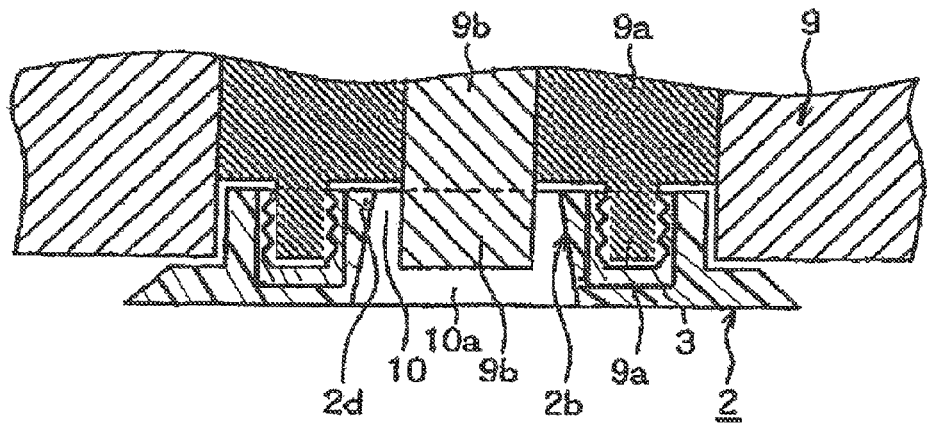
FIG. 3 is a schematic illustration showing in cross-sectional view one step of a process for manufacturing the sealing structure shown in FIG. 1.

FIG. 3 illustrates a condition in which the component mounting member 2 shown in FIG. 2 is located in a mold 9 for blow molding as an insert. In the illustrated embodiment, the mold 9 includes a first movable segment 9*a* and a second movable segment 9*b*, which can be moved independently from each other relative to the mold 9. The first movable segment 9*a* has a pair of projections 9*a*' which extend into the cavity of the mold and which are used to temporarily hold the component mounting member 2 as fitted into the nuts 3 buried therein in position inside the cavity of mold 9. On the other hand, the second movable segment 9*b* has its bottom end portion 9*b*' which is generally columnar in shape and which extends into the space defined by the inner circumferential surface 2*b* of the component mounting member 2 now temporarily supported in position by the first movable segment 9*a* and defines the component receiving space or through-hole 8 when blow molding is carried out. Incidentally, these first and second movable segments 9*a* and 9*b* may be of a structure that allows each of them to be located in its desired location by means of a slide mechanism or of a detachable structure.

A gap 10 formed between the inner circumferential surface 2*b* of component mounting member 2 and the bottom end portion 9*b*' of second movable segment 9*b* should have a size sufficiently large to allow a parison, or a tubular molten resin, for blow molding to move therein when the parison is subjected to blow molding and thus is inflated. The bottom end portion 9*b*' is preferably of a generally convergent or tapered in shape so as to allow the bottom end portion 9*b*' to be easily pulled out of the blow-molded plastic hollow product 1 to thereby leave the component receiving space 8 when the mold 9 is opened after blow molding. It should also be noted that in order to allow the parison for blow molding to sufficiently move into the gap 10 when the parison is inflated, the gap 10 preferably has its entrance section 10*a* which is sufficiently wide. As a result, it is preferable for the inner circumferential surface 2*b* of the component mounting member 2 to have a generally conical shape having an appropriate inclined angle. However, if the inclined angle of the inner circumferential surface 2*b* is too large, then the variation in thickness of the cylindrical section 1*d* formed by blow molding may become too large, which might cause some trouble. In view of these circumstances, the inclined angle of the inner circumferential surface 2*b* is, in general, set in a range between 15 and 75 degrees, more preferably between 30 and 60 degrees, relative to a hypothetical vertical line which is generally normal to the outer surface of plastic hollow product 1.

Figure 4:
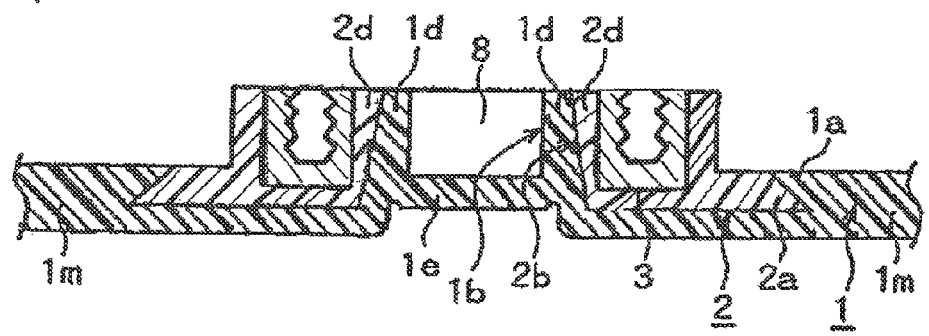
FIG. 4 is a schematic illustration showing in cross-sectional view a further step of a process for manufacturing the sealing structure shown in FIG. 1.

FIG. 4 illustrates a condition in which after blow molding using the component mounting member 2 as an insert as located in the mold 9 as shown in FIG. 3, a blow-molded product is taken out of the mold 9. That is, with the component mounting member 2 held in position in the cavity of the mold 9, a parison of the first resin is placed inside the cavity of the mold 9 and then a pressurized gas is introduced into the parison to have the parison inflated within the cavity defined by the mold 9 when closed. Thus, the parison is pushed against the inner surface of the mold 9 to thereby form the peripheral wall 1*m* of a predetermined thickness, in which case, a portion of the parison surrounds the inclined end portion 2*a* of the component mounting member 2 to thereby form a dove-tail or V-shaped undercut section 1*a* which is complementary in shape to the inclined end portion 2*a*. Thus, by a blow molding process, the plastic hollow product 1 and the component mounting member 2 come to be integrated at an interface therebetween through thermal adhesion and in addition they are also integrated mechanically through a coupling engagement between the wedge-shaped undercut section 2*a* of the component mounting member 2 and the dove-tail or V-shaped undercut section 1*a* of the plastic hollow product 1. Furthermore, during the blow molding process, a portion of the parison moves into the gap 10 shown in FIG. 3 to thereby form not only the cylindrical section 1*d*, but also the bottom wall 1*e*. As discussed before, the inner circumferential surface 1*b* of the cylindrical section 1*d* defines the component receiving space 8.

Figure 5:
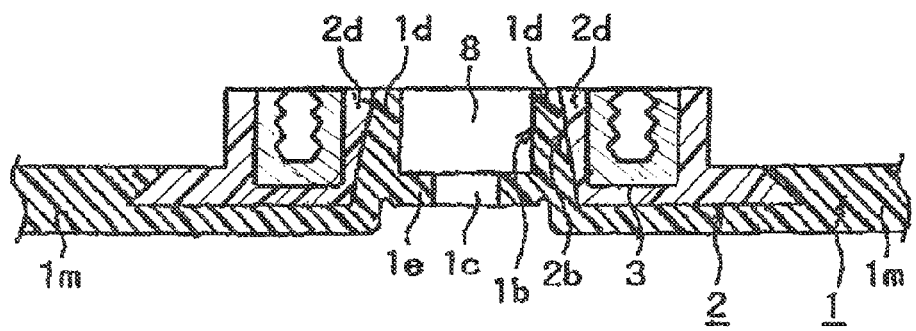
FIG. 5 is a schematic illustration showing in cross-sectional view a still further step of a process for manufacturing the sealing structure shown in FIG. 1.

FIG. 5 illustrates a condition in which an opening 1*c* has been formed in the bottom wall 1*e* shown in FIG. 4. In this case, the opening 1c may be formed by applying any appropriate cutting technology such as drilling and NC processing. Upon formation of the opening 1c, the component receiving space 8 now serves as the so-called through-hole, which allows to establish a fluidic communication between the inner space defined by the peripheral wall 1m of plastic hollow product 1 and the outer space thereof.

Next, the component 4, such as a sensor, is located as inserted into the component receiving space or through-hole 8 and the sensor is fixedly set in position by having the sensor holding member 5 secured in position by tightening the bolts 6. In this instance, an O-ring 7 is disposed inside the component receiving space or through-hole 8 to have the gap or clearance between the sensor holding member 5 and the inner circumferential surface 1b of cylindrical section 1d sealed by the O-ring 7. In this manner, the sealing structure shown in FIG. 1 is completed.

In a sealing structure constructed in this manner, the thermal adhesion condition at an interface between the plastic hollow product 1 and the component holding member 2 does not affect the sealing condition at all. Accordingly, the first resin for forming the plastic hollow product 1 and the second resin for forming the component mounting member 2 may be selected without being constrained to a thermal adhesive characteristic therebetween. For example, the first resin may be selected from a material which is relatively abundant in flexibility and thus is suitable for blow molding and on the other hand the second resin may be selected from a material which contains a reinforcing element, such as glass fiber, or which is relatively high in rigidity. In general, in the case of using an injection-molded product, such as a branch pipe or a component mounting member, as an insert during blow molding, as far as an olefin family resin, such as PP or polypropylene, is concerned, since it is relatively excellent in its thermal adhesive characteristic, it is possible to secure air-tightness between the elements when formed by blow molding. However, if such a filler as fiber glass is contained, there may arise a problem of deterioration of the thermal adhesive characteristic due to the filler. Besides, in the case of engineering plastics, such as PA or polyamide and PBT or polybutylene terephthalate, if an insert is used in a mold when blow molding is carried out, the thermal adhesive characteristic between the resulting hollow plastic product and the insert is poor and thus incapable of producing a sufficient sealing function. Moreover, in the case of a resin in which a reinforcing filler such as fiber glass is added, the thermal adhesive characteristic further decreases, and, thus, there is difficulty in producing an excellent sealing characteristic by blow molding when use is made of an insert and there is a need to use another special adhesion technique, such as a hot plate adhesion or vibration adhesion technique.

On the other hand, in accordance with the present invention, the first and second resins may be selected independently from each other depending on their desired characteristics without being constrained to a thermal adhesive characteristic between the two. For example, use may be made of an olefin family resin and its glass fiber reinforced resin, such as PP and PP-GF, an engineering plastic and its glass fiber reinforced resin, such as PA, PA-GF, PBT, PBT-GF, PPS and PPS-GF, and any other reinforced resin containing a filler, such as talc or mineral. Besides, these resins may be used for either of the first and second resins.

Incidentally, in the above-described embodiment, the component receiving space or through-hole 8 is formed by using the second movable segment 9b, but instead of or in addition to using the second movable segment 9b, the component receiving space or through-hole 8 may also be formed by NC processing or any other cutting process to process the inner circumferential surface 1b.

Figure 6:
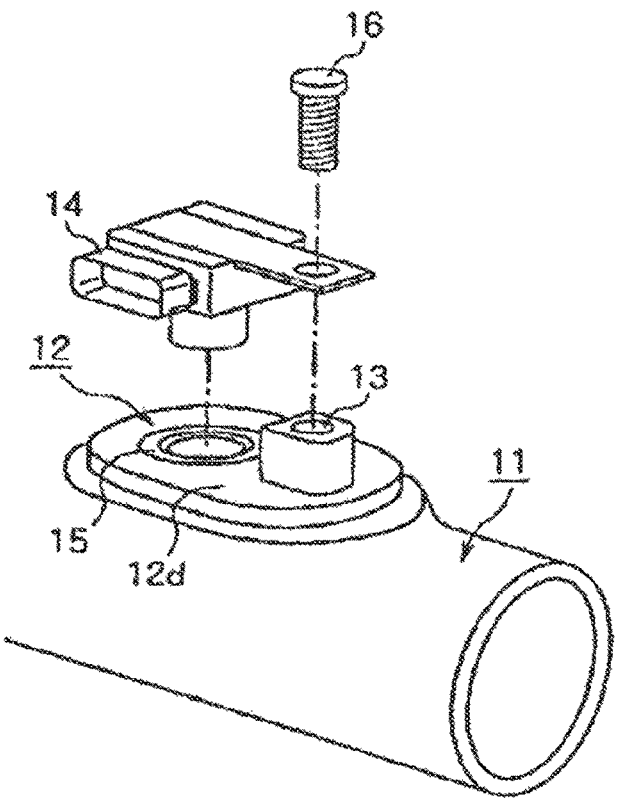
FIG. 6 is a schematic illustration showing in cross-sectional view a sealing structure of a hollow plastic product in accordance with another embodiment of the present invention.

FIG. 6 illustrates a sealing structure in accordance with another embodiment of the present invention. In this embodiment, a plastic hollow product 11 molded from the before-mentioned first resin by blow molding is generally tubular in shape, and a component mounting member 12, which is used as an insert at the time of blow molding, is integrally molded in a portion of a side surface of the plastic hollow product 11. The component mounting member 12 has a main body 12d, in which a nut 13 is buried. A component receiving space (through-hole) 15 is formed in the component mounting member 12, in which a portion of a component 14, such as a sensor, is received, and the component 14 is secured in position by having a bolt 16 threaded into the nut 13 tightened. Thus, a portion of the component 14, such as a sensor, may be located in position inside the inner space of the plastic hollow product 11 via the component receiving space or through-hole 15, so that the environment inside the hollow plastic product 11 may be detected.

Next, referring to FIGS. 7 through 9, a process for manufacturing the sealing structure shown in FIG. 6 will be described.

Figure 7:
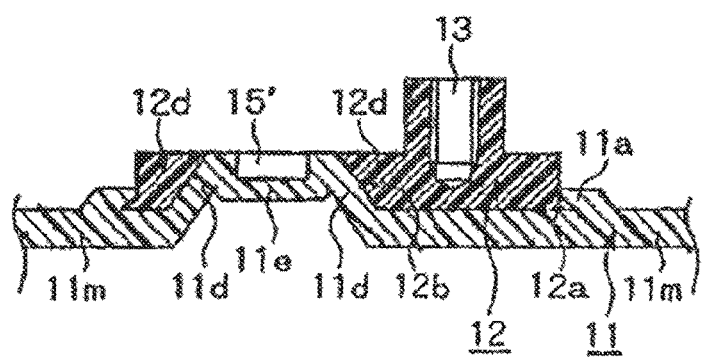
FIG. 7 is a schematic illustration showing in cross-sectional view one step of a process for manufacturing the sealing structure shown in FIG. 6.

FIG. 7 illustrates a condition in which the component mounting member 12 is first fabricated from the before-mentioned second resin by injection molding using the nut 13 as an insert and then the resulting component mounting member 12 is located in a mold for blow molding as an insert to carry out blow molding to fabricate the plastic hollow product 11, which is then taken out of the mold. The main body 12d of component mounting member 12 has an inner circumferential surface 12b, which generally defines a truncated cone, so that it is formed generally in the shape of a ring. Moreover, the component mounting member 12 has a peripheral end portion 12a where a wedge-shaped, inclined surface or undercut portion 12a is formed. By having a parison of the first resin inflated, the parison, in principle, forms a peripheral wall 11m which is generally in the shape defined by the surface of the mold used, but a portion of the parison surrounds the inclined, peripheral edge or wedge shaped undercut portion 12a of component mounting member 12 to thereby form a complementary dove-tail or V-shaped undercut portion 11a, so that a strong mechanical coupling is provided through engagement between the wedge-shaped undercut portion 12a and the V-shaped undercut portion 11a. Furthermore, another portion of the parison forms a generally conical-shaped wall section which contacts the conical inner circumferential surface 12b of the component mounting member 12. And, similarly as in the case of FIG. 3, a bottom wall 11e and a recess 15' are formed by a movable segment, which is not shown, of a mold, which is not shown.

Figure 8:
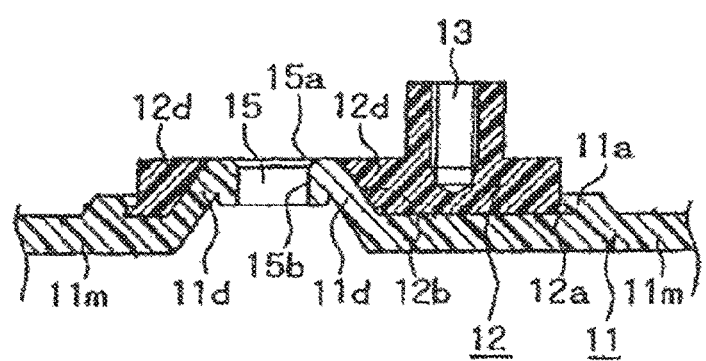
FIG. 8 is a schematic illustration showing in cross-sectional view a further step of a process for manufacturing the sealing structure shown in FIG. 6.

Next, as shown in FIG. 8, the recess 15' shown in FIG. 7 is subjected to cutting processing to thereby form a component receiving space or through-hole 15 which is defined by an inner circumferential surface 15b and its top portion is beveled to form a beveled portion 15a, thereby preferably forming the component receiving space (through-hole) 15 in a shape gradually expanding toward above. Incidentally, the inner circumferential surface 15b forms a through-hole 15 having a predetermined diameter for example by drilling, and an upper end portion of the conical wall portion forms the cylindrical section 11d. Thus, the inner circumferential surface 15b of the cylindrical section 11d defines the component receiving space or through-hole 15 and the outer circumferential surface of the cylindrical section 11d is in contact with the conical, inner circumferential surface 12b of the component mounting member 12. Accordingly, it is so structured that the cylindrical section 11d, which defines the component receiving space or through-hole 15, is backed by the main body 12d of the component mounting member 12.

Figure 9:
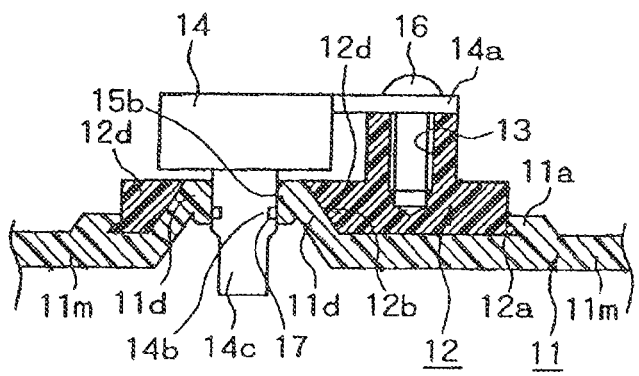
FIG. 9 is a schematic illustration showing in cross-sectional view a still further step of a process for manufacturing the sealing structure shown in FIG. 6.

FIG. 9 illustrates a condition in which a component 14 such as a sensor is mounted in the structure shown in FIG. 8. That is, the component 14 includes a component holding member 14a having a hole formed therein and a bolt 16 extends through the hole and threaded into the nut 13 for tightening so that the component 14 comes to be fixed in position. In this case, a portion of the component 14, e.g., a sensor portion 14c, comes to be located in the inner space of the plastic hollow product 11 as extending through the component receiving space (through-hole) 15. In the illustrated embodiment, the sensor portion 14c of component 14 is generally in a cylindrical shape and a circumferential groove 14b is provided in the outer peripheral surface of the sensor portion 14c so that an O-ring 17 is partially received in the circumferential groove 14b. Thus, the O-ring 17 is interposed between the sensor portion 14c of component 14 and the inner circumferential surface 15b of cylindrical section 11d, so that the through-hole 15 is in a sealed condition. Thus, in this case also, the thermal adhesive condition at the interface between the plastic hollow product 11 and the component mounting member 12 has nothing to do with the air-tightness condition at the through-hole 15. As a result, selection of the first and second resins for forming the plastic hollow product 11 and the component mounting member 12, respectively, has nothing to do with the sealing condition at the through-hole 15. Moreover, the sealing condition at the through-hole 15 is established by the O-ring 17 as sealing means in contact with the cylindrical section 11d comprised of the first resin, and, if a resin suitable for blow molding is selected as the first resin, then since it is a resin which is relatively flexible, the sealing condition at the through-hole 15 may be maintained extremely securely. In particular, in the case when the plastic hollow product 11 is used in an air-intake system of an automobile engine, it is constantly subjected to vibration during operation of the engine, but in such a case, the sealing condition of the through-hole 15 may be prevented from deteriorating.

Figure 10:
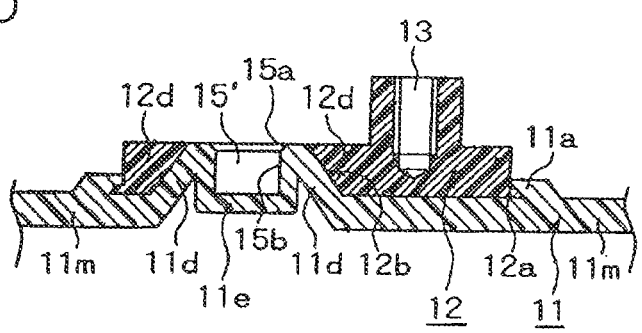
FIG. 10 is a schematic illustration showing in cross-sectional view a step of a process for manufacturing a sealing structure in accordance with a further embodiment of the present invention.
Figure 11:
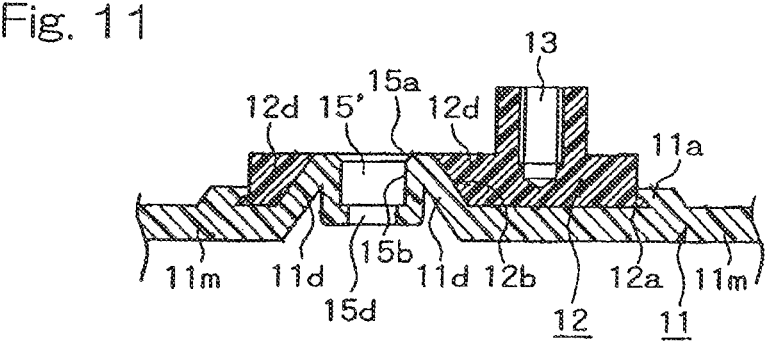
FIG. 11 is a schematic illustration showing in cross-sectional view a further step of the process shown in FIG. 10.
Figure 12:
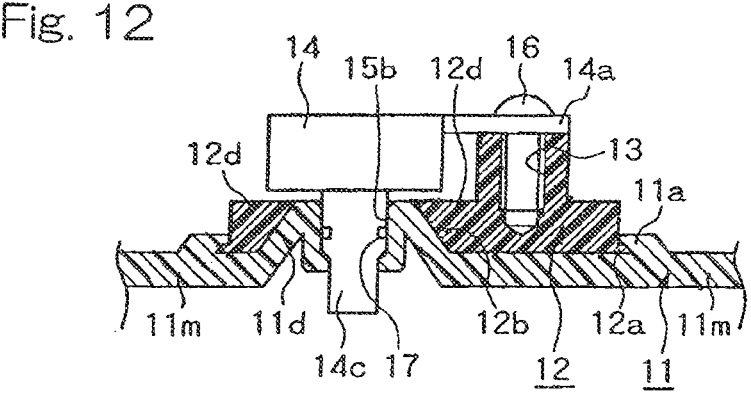
FIG. 12 is a schematic illustration showing in cross-sectional view a still further step of the process shown in FIG. 11.

FIGS. 10 through 12 illustrate a process for manufacturing a sealing structure based on a further embodiment of the present invention and it is particularly an improvement over the embodiment shown in FIG. 7. Incidentally, in the embodiment shown in FIGS. 10 through 12, those elements similar to those shown in the embodiment of FIGS. 7 through 9 are indicated by similar reference numerals so that their detailed explanation will not be repeated.

In this embodiment, as shown in FIG. 10, in the case of blow molding with the component mounting member 12 located in a mold, which is not shown, as an insert, a component receiving space (through-hole) 15' having a predetermined inner circumferential surface 15b and a beveled portion 15a is formed by a movable segment (not shown) which has a predetermined size and which is movably provided in a mold (not shown). Thus, no cutting processing is required for defining the inner circumferential surface 15b of component receiving space (through-hole) 15', and it is not necessary to carryout processing for the beveled portion 15a, either.

Next, as shown in FIG. 11, a bottom wall 11e which defines the component receiving space 15' is drilled to form an opening 15d therein. Then, as shown in FIG. 12, a component 14 such as a sensor is fixedly mounted on the component mounting member 12 by having a bolt 16 extended through a hole formed in the component holding portion 14a and threaded into the nut 13 for tightening. In this case, the sensor portion 14c of the component 14 is inserted into the through-hole 15 with an O-ring 17 disposed between the sensor portion 14c and the cylindrical section 12d to set the through-hole 15 in a sealed state.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A sealing structure of a through-hole formed in a plastic hollow product, comprising:

said plastic hollow product including a cylindrical section, defining the through-hole for communication between an interior of the plastic hollow product and an exterior of the plastic hollow product, and first engaging means, said cylindrical section projecting outwardly from a peripheral wall which defines a hollow space as the interior of said plastic hollow product, wherein said cylindrical section and said peripheral wall are unitary in structure and comprise a first material, said first engaging means being provided below an outside surface of said peripheral wall, said outside surface facing the exterior of the plastic hollow product;

a component mounting member including a contact portion, in contact with an outside surface of said cylindrical section, and second engaging means to be engaged with said first engaging means to establish a mechanical coupling with said plastic hollow product, wherein said component mounting member comprises a second material which is higher in rigidity than said first material, whereby said mechanical coupling is established by having an inclined end section of said second engaging means in the shape of a wedge along a periphery of said component mounting member buried below said outside surface of said peripheral wall such that no portion of said component mounting member is located in the interior of the plastic hollow product when said first engaging means is brought into engagement with said second engaging means as a result of blow molding said plastic hollow product using said component mounting member as an insert; securing means configured to receive at least a portion of the component which extends through said through-hole for detecting a condition of an environment in said hollow space, to said component mounting member; and sealing means interposed between said cylindrical section and said component for sealing a gap therebetween to thereby seal said through-hole.

2. The sealing structure of claim 1, wherein said plastic hollow product is blow-molded from a first resin.

3. The sealing structure of claim 2, wherein said plastic hollow product constitutes at least a portion of an air-intake duct of an automobile engine.

4. The sealing structure of claim 2, wherein said cylindrical section projects radially outwardly from said peripheral wall to define an inner circumferential surface and an outer circumferential surface, said inner circumferential surface defining said through-hole.

5. The sealing structure of claim 4, wherein said first engaging means includes a V-shaped undercut structure formed in said peripheral wall and said second engaging means includes a wedge-shaped undercut structure complementary in shape to said V-shaped undercut structure.

6. The sealing structure of claim 2, wherein said component mounting member is formed by injection molding from a second resin which is higher in rigidity than said first resin.

7. The sealing structure of claim 6, wherein said second resin includes a rigidity increasing material.

8. The sealing structure of claim 6, wherein said second resin includes fiber glass.

9. The sealing structure of claim 1, wherein said securing means includes at least one nut buried in said component mounting member and at least one corresponding bolt which extends through a hole formed in a portion of said component and threaded into said nut for tightening.

10. The sealing structure of claim 1, wherein said sealing means includes an elastic member.

11. The sealing structure of claim 10, wherein said elastic member is an O-ring.

12. A sealing structure of a through-hole formed in a plastic hollow product, said plastic hollow product including a cylindrical section, defining the through-hole for communication between an interior of the plastic hollow product and an exterior of the plastic hollow product, and first engaging means, said first engaging means being provided below an outside surface of a peripheral wall of said plastic hollow product, said outside surface facing the exterior of the product; and said sealing structure comprising:

a component mounting member including a contact portion in contact with an outside surface of said cylindrical section and second engaging means to be engaged with said first engaging means to establish a mechanical coupling with said plastic hollow product, whereby said mechanical coupling is established by having an inclined end section of said second engaging means in the shape of a wedge along a periphery of said component mounting member buried below said outside surface of said peripheral wall such that no portion of said component mounting member is located in the interior of said plastic hollow product when said first engaging means is brought into engagement with said second engaging means as a result of blow molding said plastic hollow product using said component mounting member as an insert;

securing means configured to secure a component, at least a portion of the component extends through said through-hole for detecting a condition of an environment in said hollow space, to said component mounting member; and sealing means interposed between said cylindrical section and said component to seal said component against the cylindrical section to thereby seal said through-hole.

* * * * *